(12) United States Patent
Manickam et al.

(10) Patent No.: US 8,839,354 B2
(45) Date of Patent: Sep. 16, 2014

(54) MOBILE ENTERPRISE SERVER AND CLIENT DEVICE INTERACTION

(71) Applicant: Verizon Patent and Licensing Inc., Arlington, VA (US)

(72) Inventors: Vetha S. Manickam, Chennai (IN); Shan K. Sasidharan, Kollam (IN); Vikram C. Prakash, Secunderabad (IN); Venkata Krishna Adinarayana Adari, Temple Terrace, FL (US); Sambasiva R. Bhatta, Tampa, FL (US); Sanjay Singh, Tampa, FL (US); Viral V. Vyas, Wesley Chapel, FL (US); Sireesh Mutharaju, Chennai (IN); Pranay Bajpai, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/731,789

(22) Filed: Dec. 31, 2012

(65) Prior Publication Data

US 2014/0189781 A1   Jul. 3, 2014

(51) Int. Cl.
*H04L 9/00* (2006.01)
*H04L 9/32* (2006.01)
*H04L 29/06* (2006.01)

(52) U.S. Cl.
CPC ............. *H04L 63/20* (2013.01); *H04L 67/42* (2013.01)
USPC .................................. 726/1; 726/27; 713/193

(58) Field of Classification Search
CPC ......... H04L 63/20; H04L 63/08; H04L 63/10; H04L 63/101; G06F 21/335; H04W 12/00
USPC ...................... 726/1–7, 26–30; 713/150–152, 713/189–193; 380/270
See application file for complete search history.

(56) References Cited

U.S. PATENT DOCUMENTS

| 7,353,533 | B2 * | 4/2008 | Wright et al. ................. 726/1 |
| 7,778,801 | B2 * | 8/2010 | Smith et al. ................. 702/186 |
| 7,870,255 | B2 * | 1/2011 | Shenfield et al. ............ 709/225 |
| 2014/0007222 | A1 * | 1/2014 | Qureshi et al. ................ 726/16 |

* cited by examiner

*Primary Examiner* — Hosuk Song

(57) ABSTRACT

A system includes an application server that hosts a plurality of enterprise applications and stores enterprise data associated with each of the enterprise applications. A client device executes a client application that can provide access to each of the enterprise applications. The client application includes a memory protection engine that allocates a first memory location for the enterprise data transmitted to the client device so the enterprise data is accessible to each of the plurality of enterprise applications through the client application. A second allocated memory location is allocated for non-enterprise data. A mobile enterprise server transmits the enterprise data to the client device.

20 Claims, 5 Drawing Sheets

MOBILE ENTERPRISE SERVER AND CLIENT DEVICE INTERACTION

BACKGROUND

Under a Bring-Your-Own-Device (BYOD) policy, businesses provide email and other information to employee-owned mobile devices or computers. Without a BYOD policy, some businesses required employees to carry two cell phones—one for business use and one for personal use. A BYOD policy, however, allows employees to user their own cell phone, tablet computer, personal computer, etc., for both personal and business use. Businesses can also benefit from a BYOD policy. For example, a BYOD policy may reduce operating expenses because the devices and associated data plans are owned and paid for by the employee.

DETAILED DESCRIPTION

While both businesses and employees can benefit from a Bring-Your-Own-Device (BYOD) policy, implementing a BYOD policy can present some challenges. For example, business servers must accommodate different types of devices, each with different hardware components, operating systems, memory capabilities, networking capabilities, and the like. Securing employee-owned devices is also a challenge. One solution is a system that has a mobile enterprise server that facilitates communication between client devices and servers storing business application and information.

The exemplary system described below includes an application server that hosts a plurality of enterprise application and stores enterprise data associated with the enterprise application. A client device executes a client application that can provide access to the plurality of enterprise applications. The client application includes a memory protection engine that allocates one memory location for the enterprise data transmitted to the client device so the enterprise data is accessible to each of the plurality of enterprise applications through the client application. Another memory location is allocated for non-enterprise data. A mobile enterprise server transmits the enterprise data to the client device. With the client application, the mobile enterprise server can provide enterprise applications and enterprise data to client devices with different operating systems, which is helpful when putting a BYOD policy into practice. The client application itself may be platform dependent and may be downloaded to the client device when the client device registers with the mobile enterprise server. Moreover, the mobile enterprise server retains control over the security of the enterprise applications and enterprise data provided through the client application. The mobile enterprise server may apply different security policies to different types of client devices or for different users. The exemplary system described may take many different forms and include multiple and/or alternate components and facilities. While an exemplary system is shown in the Figures, the exemplary components illustrated are not intended to be limiting. Indeed, additional or alternative components and/or implementations may be used.

Figure 1:
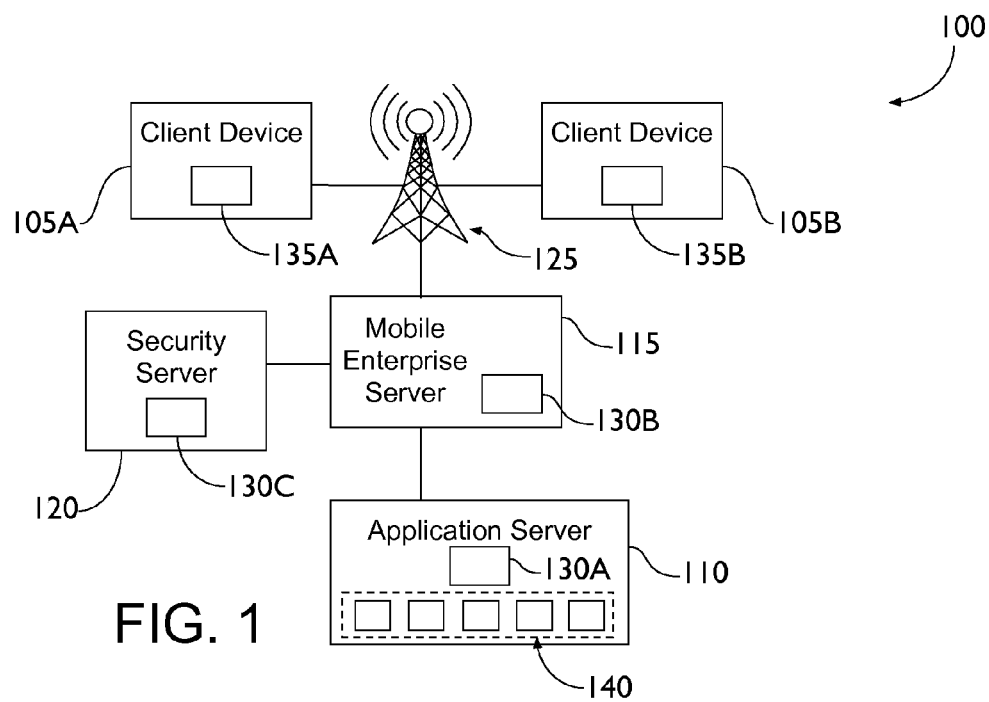
FIG. 1 illustrates an exemplary system having a client device in communication with an application server via a mobile enterprise server.

As illustrated in FIG. 1, the system 100 includes a client device 105, an application server 110, a mobile enterprise server 115, and a security server 120 in communication over a communication network 125.

The client devices 105A and 105B (collectively, 105) may each include any number of components configured to execute computer readable instructions. In general, the client device 105 may include a mobile smartphone, a tablet computer, a laptop computer, a desktop computer, or the like. Exemplary components 200-215 of the client device 105 are discussed below with reference to FIG. 2 and exemplary modules 300-350 of the client device 105 are discussed below with reference to FIG. 3. Although only two client devices 105 are shown in FIG. 1, the system 100 may include any number of client devices 105.

The client device 105 may be configured to execute a client application 135. The client application 135 may allow the client device 105 to access one or more enterprise applications, collectively shown at 140, hosted by the application server 110. Enterprise applications 140 may include applications configured to implement a business tool. Examples of enterprise applications 140 may include an email application, a calendar application, a document management system, a billing application, a project management application, an information processing application (e.g., a word processing application, a spreadsheet application, etc.), or any other type of application that a business may wish to provide to employees. Examples of enterprise data include the information associated with each enterprise application 140 in electronic form. For instance, for an email application, the enterprise data may include emails and attachments, email addresses, and the like. Some enterprise applications 140 may share enterprise data. For instance, an email application and address book application may share contact information stored as enterprise data.

The client device 105 may store one or more enterprise applications 140, enterprise data, or both, locally, and the client application 135 may allow an authorized user to use the enterprise application 140 and view the enterprise data on the client device 105. The executable code to execute the enterprise application 140 may be stored locally on the client device 105. The location of the enterprise application 140, the enterprise data, or both, may be decided by a developer of the enterprise application 140. In one possible implementation, the client application 135 may access the enterprise application 140 and enterprise data remotely through a web server via, e.g., the Internet or another network. In this example implementation, the executable code for the enterprise application 140 may be stored on the web server, such as the application server 110, and the client application 135 may include a link to the web server hosting the enterprise application 140. In a hybrid approach, certain aspects of the enterprise application 140 and enterprise data may be stored locally on the client device 105 while others are stored remotely on the web server. In this hybrid approach, the executable code for the enterprise application 140 may be stored locally on the client device 105. The enterprise data may be retrieved from the application server 110 and stored temporarily on the client device 105 when the enterprise application 140 is executed. Alternatively, in the hybrid approach, the enterprise application 140 may be hosted on a web server, such as the application server 110, while the enterprise data is stored on the client device 105.

The client application 135 may be device dependent, meaning that the client application 135 installed on the client device 105 may depend upon the hardware or operating system of the client device 105. For example, a client device 105 with a mobile-based operating system may use a different client application 135 than a client device 105 with a laptop or desktop computer-based operating system. In addition, client devices 105 with different mobile operating systems may receive different versions of the client application 135. The operation of the client application 135 may be generally the same regardless of the type of client device 105 or operating system, however. In one exemplary approach, a user may access the client application 135 from different client devices 105 using, e.g., the same credentials at each client device 105. Each client device 105 may be subject to a different security policy, discussed in greater detail below. In short, the security policy for user's mobile phone may be different from the security policy for a user's desktop computer. In addition, different types of client devices 105 may format the enterprise applications 140 and enterprise data differently for presentation to the user. For instance, the client device 105 may be configured to present the enterprise applications 140 and enterprise data in a "mobile" format designed to be viewed on a smaller screen or presented in either portrait or landscape mode when the client device 105 includes a mobile phone or tablet computer. A different format may be used when the enterprise application 140 and enterprise data is presented to the user on a larger screen of a desktop or laptop computer. Furthermore, different types of client devices 105 may be configured to access the enterprise applications 140 and enterprise data through the mobile enterprise server 115 differently. Mobile phones and some table computers, for example, may be configured to generally access enterprise applications 140 and enterprise data through a cellular telecommunications network while desktop computers, laptop computers, and some tablet computers may be configured to generally access enterprise applications 140 and enterprise data through a wired or wireless computer network, such as the Internet or a local area network (LAN).

The application server 110 may include any number of processing devices 130A and databases configured to host enterprise applications 140 and enterprise data. The application server 110 may provide access to the enterprise applications 140 and enterprise data either by making the enterprise applications 140 and enterprise data to the client device 105 or by acting as a web server. Although only one application server 110 is shown, the system 100 may include any number of application servers 110.

The mobile enterprise server 115 may include any number of processing devices 130B configured to facilitate encrypted and secure communication between the client device 105 and the application server 110. The mobile enterprise server 115 may be configured to transmit enterprise applications 140, encrypted enterprise data, or both, from the application server 110 to the client device 105 and vice versa. The mobile enterprise server 115 may facilitate communication between the client device 105 and the application server 110 in accordance with a security policy, stored on the mobile enterprise server 115 and synchronized with the client device 105, that governs interactions between the client device 105 and application server 110.

The requirements of the security policy may be determined by an administrator of the mobile enterprise server 115, and the security policy may be periodically or occasionally updated depending on various circumstances or type of client device 105. For instance, the security policy for mobile phones may be different from the security policy for desktop computers. Further, the security policy may be different for different users of the same type of client device 105 or for the different types of client devices 105 used by the same user (e.g., a user's mobile phone may be subject to one security policy while the user's desktop computer may be subject to a different security policy). Also, the security policy applied to the client device 105 may depend on the information stored on the client device 105, as discussed in greater detail below.

The security policy may require that only authorized client devices 105 or authorized users of client devices 105 receive enterprise applications 140 and enterprise data. The mobile enterprise server 115 may determine whether the client device 105 is authorized based on credentials received from the client device 105. The credentials, which may be generated by the client device 105 or provided by a user, may be received by the mobile enterprise server 115 for authentication. The mobile enterprise server 115 may authenticate the credentials or transmit the credentials to the security server 120, discussed below, for authentication.

The security policy may also require that the client device 105 implement particular features to use the enterprise applications 140 and enterprise data. The mobile enterprise server 115 may be configured to only transmit enterprise applications 140 and enterprise data to the client device 105 if the client device 105 implements those features in accordance with the security policy. For example, the security policy may require that the client device 105 encrypt stored enterprise data and allow the stored enterprise data to be remotely deleted in response to a command received from the mobile enterprise server 115. The mobile enterprise server 115 may prohibit communication between the client device 105 and the application server 110 if these or other features are not implemented by the client device 105.

In one possible approach, the mobile enterprise server 115 may be configured to interact with any number of client devices 105. The actions of one client device 105 may dictate how the mobile enterprise server 115 manages enterprise data of another client device 105. For example, a security breach of one client device 105 may cause the mobile enterprise server 115 to delete some or all enterprise data on one or more other client devices 115. This may occur if, for instance, sensitive information that could be used to access enterprise data stored on one or more client devices 105 becomes compromised.

Other features of the mobile enterprise server 115 are discussed below with reference to the modules 400-445 shown in FIG. 4.

The security server 120 may include a processing device 130C configured to authenticate the client device 105, the user of the client device 105, or both. The security server 120 may be configured to receive credentials associated with the client device 105 from mobile enterprise server 115. The security server 120 may be configured to compare the received credentials with security information, which may be stored in a database on the security server 120 and may identify authorized client devices 105, users, or both. The security server 120 may authenticate a client device 105 or authorized user if the credentials indicate that authorization should succeed in view of the security information.

Figure 2:
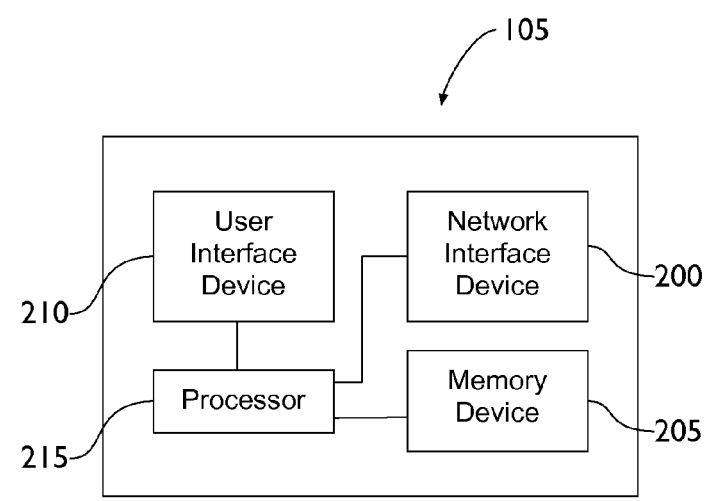
FIG. 2 illustrates exemplary components of the client device of FIG. 1.

FIG. 2 is a block diagram of an exemplary client device 105. As illustrated, the client device 105 includes a network interface device 200, a memory device 205, a user interface device 210, and a processor 215.

The network interface device 200 may include computing hardware that allows the client device 105 to communicate with other devices over the communication network 125. The network interface device 200 may include an antenna for wireless communication and may be configured to generate signals in accordance with one or more communication protocols such as those for communicating over a packet-switched network or a cellular network. The network interface device 200 may be configured to receive messages from and transmit messages to the mobile enterprise server 115 via the communication network 125.

The memory device 205 may include any volatile or non-volatile memory configured to electronically store information or computer-executable instructions. The memory device 205 may store enterprise applications 140, enterprise data, or both. In addition, the memory device 205 may store credentials or other authentication information used to authenticate the client device 105, the user, or both. Example instructions stored in the memory device 205 may include instructions for allocating a memory location of the memory device 205 for enterprise data, encrypting the enterprise data, decrypting the enterprise data, preventing unauthorized access to the enterprise data, receiving the security policy from the mobile enterprise server 115, applying the security policy to the enterprise data, and selectively deleting the enterprise data from the allocated memory location. The memory device 205 may store additional or different instructions and information, such as instructions and information directed to non-enterprise applications that may be executed by the client device 105, as well. The non-enterprise instructions and information may include information about the owner of the client device 105 or identification information of the client device 105. The instructions and information for non-enterprise applications may depend on the client device 105. For instance, if the client device 105 includes a mobile phone, the non-enterprise applications stored in the memory device 205 may include a phone application, a camera application, a social networking application, productivity applications, a messaging application, etc. The memory location of the memory device 205 may be allocated by reference to one or more adjacent or non-adjacent memory addresses within the memory device 205. The amount of memory to allocate may be designated by the client application 135, the enterprise application 140, the application server 110, or the mobile enterprise server 115. While only one memory device 205 is shown in FIG. 2, the client device 105 may include any number of memory devices 205.

The user interface device 210 may be configured to facilitate interaction between the client device 105 and the user. The user interface device 210 may include a display screen for presenting information to a user and an input device for receive inputs from the user. In one possible approach, the user interface device 210 may include a touch-sensitive display that can present information to the user via, e.g., a graphical user interface and receive user inputs through, e.g., a virtual keyboard or other data representation such as a virtual button or icon. The user interface device 210 may be configured to convert the user inputs received into signals representing the user's intent for interacting with the client device 105. The user interface device 210 may be configured to identify certain gestures performed by the user as the user input. Example gestures may include "dragging" a data representation, such as an icon, to a different part of the touch-sensitive screen or "selecting" a data representation. The user interface device 210 may be configured to prompt the user to provide certain information, such as credentials, and present various types of information to the user, such as a list of enterprise applications 140 available via the client device 105 and enterprise data associated the enterprise application 140.

The processor 215 may include any processing device in communication with the network interface device 200, the memory device 205, and the user interface device 210. The processor 215 may be configured to access and execute instructions stored in the memory device 205. In accordance with the instructions stored in the memory device 205, the processor 215 may allocate a memory location of the memory device 205 for enterprise data, encrypt the enterprise data, decrypt the enterprise data, prevent unauthorized access to the enterprise data, receive and apply the security policy, and selectively delete enterprise data from the allocated memory location. The processor 215 may be configured to receive and interpret signals generated by the network interface device 200 and the user interface device 210. Also, the processor 215 may be configured to output signals to, e.g., present information to the user via the user interface device 210 and communicate with the mobile enterprise server 115. The processor 215 may include one or more modules to carry out these features and other features of the client device 105, as discussed in greater detail below with respect to FIG. 3.

Figure 3:
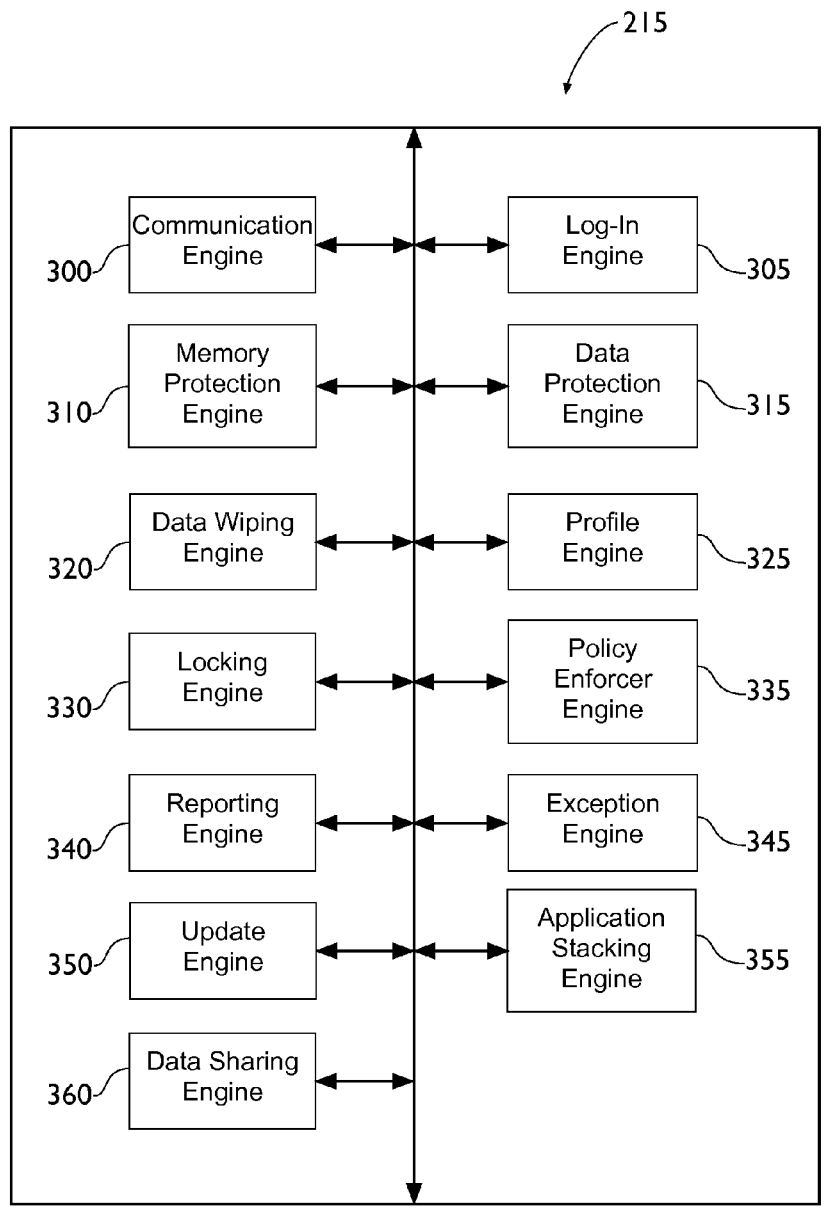
FIG. 3 illustrates exemplary modules of the client device of FIGS. 1 and 2.

FIG. 3 illustrates exemplary modules that may be used by the processor 215 to implement various features of the client device 105. The exemplary modules include a communication engine 300, a log-in engine 305, a memory protection engine 310, a data protection engine 315, a data wiping engine 320, a profile engine 325, a locking engine 330, a policy enforcer engine 335, a reporting engine 340, an exception engine 345, an update engine 350, an application stacking engine 355, and a data sharing engine 360.

The communication engine 300 may manage communications received from or transmitted to the mobile enterprise server 115, and the processor 215 may call the communication engine 300 each time the client application 135 is launched. When the client application 135 is launched, the communication engine 300 may initiate communication with the mobile enterprise server 115 or the security server 120 to generate a session token. The session token may be used to authenticate communications between the mobile enterprise server 115 and the client device 105 during a communication session. The communication engine 300 may be configured to parse Extensible Markup Language (XML) to decode certain communications from the mobile enterprise server 115. If the user has not provided credential to log into the client application 135, the communication engine 300 may call the log-in engine 305 to authenticate the user, as discussed below.

The log-in engine 305 may be configured to retrieve credentials that can authenticate the user or the client device 105. Example credentials may include a username, password, encryption key, token, or biometric input. The log-in engine 305 may be configured to prompt the user to provide the credentials, and any number of credentials may be required for authentication. The log-in engine 305 may transmit the credentials to the mobile enterprise server 115 for authentication. In addition to the credentials, the log-in engine 305 may further transmit other authentication information about the client device 105. Other authentication information may include a serial number, device type (i.e., laptop, mobile phone, tablet computer, etc.), operating system and version, or the like. The log-in engine 305 may provide sufficient credentials and authentication information for the mobile enterprise server 115 or security server 120 to authenticate the client device 105, the user, or both. The mobile enterprise server 115 or the security server 120 may generate and transmit the session token after the client device 105 is authenticated based on the information provided from the log-in engine 305. The session token, as discussed above, may be used by the communication engine 300.

The log-in engine 305 may be called at various times during operation of the client device 105. For example, the log-in engine 305 may be called when the client application 135 or any enterprise application 140 is launched to check whether a valid session token exists prior to allowing access to the enterprise application 140 or any enterprise data via the client application 135. If the session token is invalid, the log-in engine 305 may prompt the user to provide credentials for authentication and complete the authentication process described above. If the session token is valid, the processor 215 may transmit the session token to the mobile enterprise server 115 to retrieve the latest cookie for the client application 135 or enterprise application 140. The information contained within the cookie may be used when the client application 135 or enterprise application 140 is launched.

The log-in engine 305 may provide the client device 105 with other features. The log-in engine 305 may, for instance, supply credentials for applications that are not accessed through the client application 135 (e.g., applications that are not enterprise applications 140). The log-in engine 305 may be configured to determine whether a launched application is an enterprise application 140. If the log-in engine 305 determines that a launched application is not an enterprise application, the log-in engine 305 may provide credentials to the launched application to generate a corresponding session token. Otherwise, the log-in engine 305 may proceed as previously described.

The memory protection engine 310 may be configured to manage the allocation of memory for enterprise applications 140. For instance, the memory protection engine 310 may split the memory device 205 into an enterprise area (e.g., a first memory location) and a personal area (e.g., a second memory location). The enterprise area may be for storing enterprise applications 140 and enterprise data. The personal area may be for storing other types of information, unrelated to the enterprise application 140 and enterprise data, on the client device 105. The split between the enterprise area and personal area may through the use of virtual memory. The memory protection engine 310 may allocate one or more memory locations in the enterprise area for enterprise applications 140 and enterprise data and control access to those memory locations. As discussed above, the amount of memory to allocate may be designated by the client application 135, the enterprise application 140, the application server 110, or the mobile enterprise server 115. The particular memory locations, which may be designated by adjacent or non-adjacent memory addresses, may be determined by the memory protection engine 310. The memory protection engine 310 may consult and apply the security policy to determine whether to allow access to the enterprise data. Sometimes, unauthorized applications attempt to access enterprise data. The memory protection engine 310 may be configured to detect a request from an unauthorized application and deny the request as a violation of the security policy. In one possible implementation, the memory protection engine 310 may be configured to delete the requested enterprise data from the client device 105 in response to a security policy violation or unauthorized application request. In accordance with the security policy, the memory protection engine 310 may alternatively delete only the enterprise data requested by the unauthorized application or in violation of the security policy from the allocated memory location instead of all enterprise data from the client device 105. For instance, the memory protection engine 310 may select one or more memory addresses, which may or may not be adjacent to one another, associated with a particular enterprise application 140 or the enterprise data requested by the unauthorized application or in violation of the security policy. Only the memory at the selected memory addresses may be deleted so that allocated memory locations for, e.g., other enterprise applications 140 or non-enterprise applications may remain on the client device 105.

The data protection engine 315 may be configured to encrypt and decrypt the enterprise data stored on the client device 105. The data protection engine 315 may be configured to encrypt the enterprise data when stored in the memory device 205 at the allocated memory location and decrypt the enterprise data when the enterprise data is retrieved from the memory device 205 for presentation to the user via the user interface device 210. The data protection engine 315 may be called in response to launching or closing the client application 135 or one of the enterprise applications 140. When the client application 135 or enterprise application 140 is launched, the data protection engine 315 may decrypt the enterprise data stored in the memory device 205. If the decryption is unsuccessful, the data protection engine 315 may attempt to retrieve and decrypt the enterprise data again. If the data protection engine 315 is unable to decrypt the enterprise data a predetermined number of times, the data protection engine 315 may generate an error message indicating that the enterprise data cannot be decrypted. The error message may be transmitted to the mobile enterprise server 115 and the data protection engine 315 may call the exception engine 345, discussed in greater detail below. When the client application 135 is closed, the data protection engine 315 may encrypt the enterprise data and store the encrypted enterprise data at the allocated memory location in accordance with the memory protection engine 310. If the data protection engine 315 is unable to encrypt the enterprise data, an error message may be generated and sent to the mobile enterprise server 115, and the data protection engine 315 may call the exception engine 345.

The data wiping engine 320 be configured to manage the deletion of enterprise data and possibly other types of data from the client device 105. The data wiping engine 320 may be configured to selectively delete any data stored on the client device 105 regardless of where the data is stored. Thus, the effectiveness of the data wiping engine 320 is not limited to certain types of data, such as messages stored on the client device 105. The data wiping engine 320 may selectively delete enterprise data from the allocated memory location in response to a command or other indication that the enterprise data should be deleted. Example commands or indications may include a user input commanding that the enterprise data be deleted, a signal indicating that the client application 135 or an enterprise application 140 was closed, and an instruction from the mobile enterprise server 115 to delete the enterprise data. The data wiping engine 320 may delete enterprise data based on a state of the client device 105, such as when the client device 105 is turned off or in response to removal of a battery of the client device 105. When the battery is reinserted or power is otherwise restored or made available to the client device 105, the data wiping engine 320 may determine that the shutdown of the client device 105 was caused by a battery removal and may delete some or all of the enterprise data, such as orphaned data, before booting an operating system of the client device 105. Furthermore, the data wiping engine 320 may delete enterprise data in response to a security policy violation. The data wiping engine 320 may employ various methods to delete enterprise data. In one possible implementation, the data wiping engine 320 may encrypt the enterprise data marked for deletion and overwrite the encrypted enterprise data. The data wiping engine 320 may be configured to iteratively encrypt and overwrite the enterprise data a predetermined number of times before deleting the enterprise data from the memory device 205. In one possible approach, the data wiping engine 320 may iteratively encrypt and overwrite the enterprise data a minimum of ten (10) times.

The profile engine 325 may be configured to manage one or more profiles, each associated with a particular user of the client device 105. The profile may record user preferences, user privileges that may define the rights of the user to access certain enterprise applications 140 and certain enterprise data, and security policy compliance information such as password policies, encryption policies, etc. The profile engine 325 may be configured to synchronize the profile stored on the client device 105 with a corresponding profile stored at the mobile enterprise server 115.

The locking engine 330 may be configured to prevent unauthorized user access to the enterprise data, even if the client device 105 and a previous user of the client device 105 have been authenticated. The locking engine 330 may be configured to identify when a present user of the client device 105 is not authorized to use the client device 105 if the present user is unable to provide sufficient credentials or biometric information when prompted (e.g., the present user fails to provide an accurate username and password combination after a certain number of attempts, facial or fingerprint recognition fails to identify the present user as the authorized user, etc.). The locking engine 330 may monitor user inputs provided by the present user via the user input device. The locking engine 330 may be configured to determine whether the present user is the previous user when the client device 105 was authorized. If not, the locking engine 330 may prevent the client device 105, and thus the present user, from accessing the enterprise data. The locking engine 330 may further lock the client application 135 by closing the client application 135 and all enterprise applications 140. While locked, the client device 105 may be unable to launch the client application 135 or any enterprise applications 140. The locking engine 330 may also delete all enterprise data from the client device 105 either directly or by calling the data wiping engine 320.

The policy enforcer engine 335 may be configured to receive the security policy transmitted by the mobile enterprise server 115 and apply the security policy to enterprise data stored on the client device 105. The security policy may be pushed to the client device 105 from the mobile enterprise server 115 each time the client application 135 is launched and the user is authenticated, e.g., by logging into the client application 135. The policy enforcer may continually monitor actions of the client device 105 to determine whether the security policy has been violated. If the security policy is violated, the policy enforcer may take an appropriate action, such as calling the memory protection engine 310, the log-in engine 305, the data wiping engine 320, the data protection engine 315, the locking engine 330, etc.

The reporting engine 340 may be configured to generate and transmit reports or charts to the mobile enterprise server 115. The report or chart may include all or a subset of the enterprise data stored on the client device 105 or the application server 110 associated with one or more client applications 140. The report or chart may organize the enterprise data in a particular way for presentation to a user of the client device 105 or administrator of the mobile enterprise server 115. The reporting engine 340 may be configured to request that the mobile enterprise server 115 generate a report or chart and have the generated report or chart transmitted to the client device 105. The reporting engine 340 may present the report or chart on the client device 105.

The exception engine 345 may be configured to implement exception handling for the client device 105. The exception engine 345 may be configured to collect and consolidate error messages or other exceptions to generate exception data. The exception engine 345 may designate processes for handling the exception data. In one possible approach, the exception engine 345 may transmit the exception data to the mobile enterprise server 115 for forwarding to the application server 110. The exception engine 345 may transmit other information to the application server 110 with the exception data. The other information may include, for example, details about the client device 105 such as a device type, a phone number for the client device 105 (if, e.g., the client device 105 is a mobile phone), a model name, an exception stack trace, and coordinates of the client device 105 by, e.g., latitude and longitude. The exception engine 345 may receive an acknowledgement from the application server 110 that the exception data and other information was received.

The update engine 350 may be configured to update the enterprise applications 140 and enterprise data on the client device 105. The update engine 350 may synchronize the enterprise applications 140 and enterprise data between the client device 105 and the mobile enterprise server 115, application server 110, or both.

The application stacking engine 355 may be configured to link multiple enterprise applications 140 to one "parent" application, such as the client application 135. Through the application stacking engine 355, the mobile enterprise server 115 may be configured to allow a logged-in user to download and configure enterprise applications 140 from the application server 110 via the client application 135. The application stacking engine 355 may also be configured to apply default configurations to any one or more of the enterprise applications 140 linked to the client application 135. The application stacking engine 355 may allow for any number of applications in a frame and any number of frames within a stack. In one possible approach, the application stacking engine 355 may stack up to twelve (12) applications in a frame, and the stack may include up to five (5) frames. Different numbers of applications per frame and frames per stack, however, are possible. The number of applications per frame and frame per stack may be based on various factors such as available memory or other hardware limitations. The application stacking engine 355 may receive notifications from the mobile device manager 410 for locking, upgrading, and deleting enterprise applications 140 without user interaction.

The application stacking engine 355 may be configured to manage memory settings of one or more of the enterprise applications 140 and expose an application programming interface (API) to modules of the client device 105 such as the reporting engine 340, the exception engine 345, the data wiping engine 320, the locking engine 330, the data sharing engine 360, etc. The application stacking engine 355 may manage secure socket layer security at the SSO engine 445 for enterprise applications 140 that are configured via the client application 135. The application stacking engine 355 may be further configured to capture information such as device usage, memory usage, memory management, user profile, and services such as session, data, exception, and data loss prevention due to, e.g., an application crash by, for instance, providing local cache support.

The data sharing engine 360 may be configured to share common data among various enterprise applications 140, such as enterprise applications in the application stacking engine 355. The common data may include client device 105 information, application request information, work order information, prints, utilities files such as camera files, picture files, secure digital (SD) files, shared database information, and the like. The data sharing engine 360 may be configured to allow application stacking engine and possibly other modules and applications running on the client device 105 to share the common data and reduce memory duplication. The data sharing engine 360 may further allow the sharing of session information among various enterprise applications 140 and possible non-enterprise applications running on the client device 105.

Figure 4:
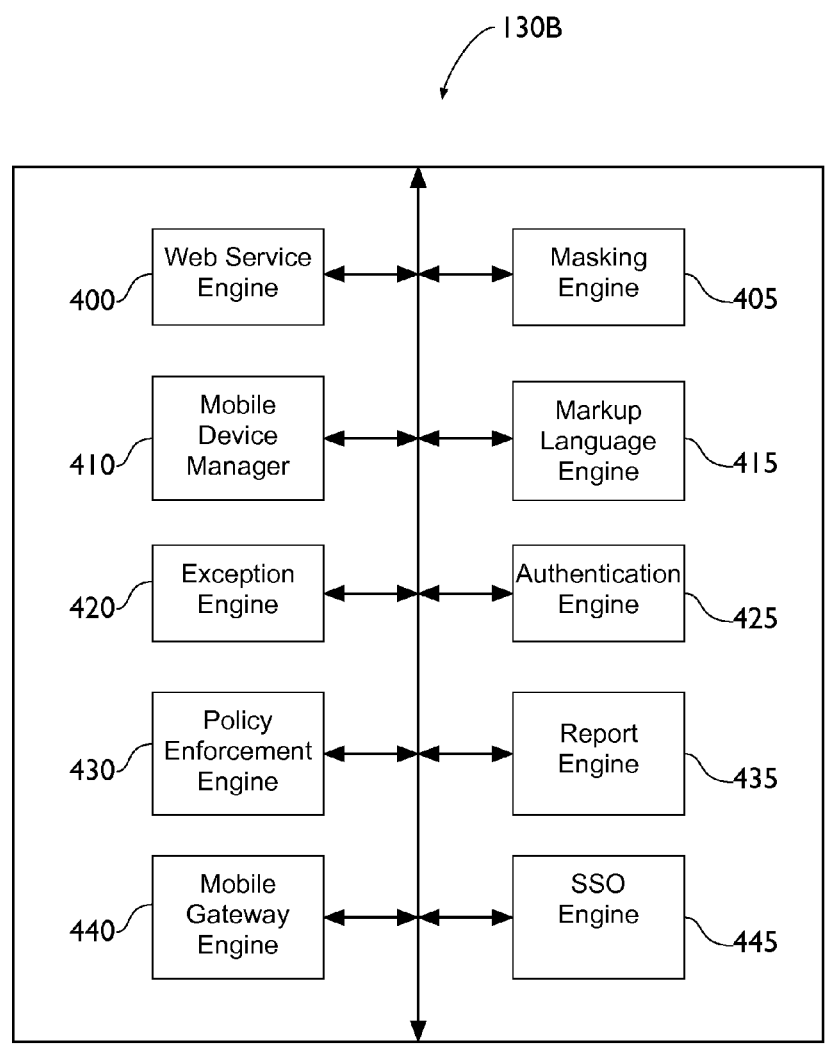
FIG. 4 illustrates exemplary modules of the mobile enterprise server of FIG. 1.

FIG. 4 illustrates exemplary modules that may be used with the mobile enterprise server 115. The exemplary modules shown in FIG. 4 include a web service engine 400, a masking engine 405, a mobile device manager 410, a markup language engine 415, an exception engine 420, an authentication engine 425, a policy enforcement engine 430, a reporting engine 435, a mobile gateway engine 440, and a single sign-on (SSO) engine 445. Any one or more of these modules may be implemented by the processing device 130B of the mobile enterprise server 115.

The web service engine 400 may be configured to provide an interface, at the mobile enterprise server 115, for enabling communication between the client device 105 and the application server 110. The mobile enterprise server 115 may call the web service engine 400 in response to receiving a request to access the application server 110 from an enterprise application 140 run on a client device 105. The web service engine 400 may receive an Extensible Markup Language (XML) script representing the request and push the request to the application server 110. If the application server 110 validates the request, the application server 110 may generate a response to the request that is transmitted back to the client device 105 via the mobile enterprise server 115.

The masking engine 405 may be configured to mask enterprise data transmitted to the client device 105. In one possible approach, the masking engine 405 may mask all data transmitted to web servers or otherwise associated with web-based applications, desktop applications, or both. Alternatively or in addition, the masking engine 405 may mask data associated with any secure application executed by the client device 105. Masking may include a bitwise operation applied to the enterprise data intended to obscure the enterprise data during transmission. The masking engine 405 may be invoked each time enterprise data is transmitted to the client device 105 in accordance with a security policy or a user preference. The masking engine 405 may mask the enterprise data at runtime by selecting and applying a masking heuristic to the enterprise data.

The mobile device manager 410 may be configured to manage user profiles stored at the mobile enterprise server 115. Each user profile may be associated with a particular user of the client devices 105 in communication with the mobile enterprise server 115. The profile may record user preferences, user privileges that may define the rights of the user to access certain enterprise applications 140 and certain enterprise data, and security policy compliance information such as password policies, encryption policies, etc. The profile engine 325 may be configured to synchronize the profile stored at the mobile enterprise server 115 with a corresponding profile stored at the client device 105.

When a client device 105 logs into the mobile enterprise server 115 by, e.g., providing credentials for authentication, the mobile device manager 410 may be called to determine whether a user profile exists, and if not, create a new user profile. The mobile device manager 410 may also create a new user profile the first time a client device 105 or user logs launches and logs into the client application 135. The mobile device manager 410 may update the user profile when necessary and transmit the updated user profile to the client device 105 for handling by, e.g., the profile engine 325 of the client device 105. The mobile device manager 410 may further determine whether the client device 105 can access the enterprise applications 140, enterprise data, and security policies based on information contained in the user profile. In some instances, the mobile device manager 410 may require the user to provide credentials before the mobile device manager 410 will determine whether the client device 105 can receive enterprise application 140 and enterprise data.

The markup language engine 415 may be configured to parse markup language contained in messages transmitted to or from the mobile enterprise server 115. For example, the markup language engine 415 may be configured to parse Extensible Markup Language (XML) to encode communications to and decode communications from the client device 105. Instead of acting as a standalone module, the markup language engine 415 may be incorporated into another module, such as the mobile gateway engine 440.

The exception engine 420 may be configured to implement exception handling for the mobile enterprise server 115. The exception engine 420 may be configured to receive exception data from the client device 105. The exception engine 420 may designate processes for handling the exception data. The exception engine 420 may forward the exception data to the application server 110 along with other information related to the exception data received from the client device 105. The other information may include, for example, details about the client device 105 such as a device type, a phone number for the client device 105 (if, e.g., the client device 105 is a mobile phone), a model name, an exception stack trace, and coordinates of the client device 105 by, e.g., latitude and longitude. The exception engine 420 may transmit an acknowledgement from the application server 110 that the exception data and other information was received to the client device 105.

The exception engine 420 may be configured to capture all exceptions raised by the client application 135 of the client device 105 as well as any other applications. Example exceptions may include data exceptions between applications, via interfacing applications, runtime exceptions via web services and data parsing, application exceptions, user security exceptions and user access exceptions, interface specific exceptions, application access exceptions, and device specific exceptions. Some or possibly all exceptions received by the exception engine 420 may be captured, analyzed, and processed by the exception engine 345 of the client device 105 prior to receipt at the exception engine 420 of the mobile enterprise server 115.

The authentication engine 425 may be configured to grant the client device 105 access to enterprise applications 140, which may include native enterprise applications 140 primarily stored on the client device 105, web-based enterprise applications 140 primarily stored on a web server such as the application server 110, or native enterprise applications 140 with components stored both on the client device 105 and a web server such as the application server 110. To authenticate the client device 105, the authentication engine 425 may communicate with the SSO engine 445, discussed below. The authentication engine 425 may maintain a registry of the enterprise applications 140 available to the client device 105 via the client application 135. The authentication engine 425 may be configured to determine whether the enterprise application 140 is registered with the authentication engine 425. If registered, when the client application 135 is launched, the authentication engine 425 may receive credentials from the client device 105 and use the credentials to grant the client device 105 access to registered enterprise applications 140.

The registry may contain non-enterprise applications as well. Non-enterprise applications may refer to applications that are hosted by servers other than the application server 110. The authentication engine 425 may also grant access to registered non-enterprise applications when launched.

The authentication engine 425 may be configured to generate a template that defines the log-in requirements for each enterprise application 140 and non-enterprise application 140 registered. The template may be based on the type of application. For instance, one template may be used for native applications, which may include enterprise applications 140 and non-enterprise applications 140 stored on the client device 105, while other types of templates may be generated for web applications and hybrid applications. Web applications may include enterprise applications 140 or non-enterprise applications 140 that require significant interaction with a web server such as the application server 110. Hybrid applications may include enterprise applications 140 or non-enterprise applications 140 that have native and web components. That is, hybrid applications may be partially stored on the client device 105 but still require significant interaction with a web server. Each generated template may be stored in a database.

The authentication engine 425 may receive an encrypted version of the credentials in the form of a policy file generated by the client device 105 and transmitted to the mobile enterprise server 115. The authentication engine 425 may decrypt the policy file and provide the credentials to the SSO engine 445 to authenticate the client device 105 for the enterprise application 140 or non-enterprise application 140, if registered, each time the client application 135, an enterprise application 140, or non-enterprise application 140 is launched at the client device 105.

The policy enforcement engine 430 may be configured to manage, enforce, and report the security policy for each client device 105 in communication with the mobile enterprise server 115. The policy enforcement engine 430 may initially apply a default policy to all client devices 105 until the policy enforcement engine 430 determines to apply a different policy. The policy enforcement engine 430 may be configured to prevent access to one or more enterprise applications 140 or delete enterprise data from the client device 105 in response to a policy violation. The policy enforcement engine 430 may disable enterprise applications 140 or delete enterprise data from the client device 105 following privilege escalation, which is also called "jailbreaking" or "rooting." The policy enforcement engine 430 may push the security policy to the client device 105 under certain circumstances, such as each time the security policy is updated or when the policy enforcement engine 430 determines that the client device 105 has an outdated or expired security policy stored locally.

The reporting engine 435 may be configured to receive reports or charts transmitted from the client device 105 to the mobile enterprise server 115. The reporting engine 435 may be configured to receive a request to generate a report or chart from the client device 105. In response to the request, the reporting engine 435 may generate the report or chart and transmit the report or chart to the client device 105. As discussed above, the report or chart may include all or a subset of the enterprise data stored on the client device 105 or the application server 110 associated with one or more client applications 140. The report or chart may organize the enterprise data in a particular way for presentation to a user of the client device 105 or administrator of the mobile enterprise server 115.

The mobile gateway engine 440 may be configured to facilitate communication between the mobile enterprise server 115 and the client device 105. The mobile gateway engine 440 may confirm that the mobile enterprise server 115 is communicating with the intended client device 105 based on information from the client device 105. The information may include a unique identifier, such as an International Mobile Equipment Identity (IMEI) number if the client device 105 includes a mobile phone. If the identity of the client device 105 cannot be confirmed from the unique identifier, the mobile gateway engine 440 may reject the communications from the client device 105. If the identity of the client device 105 is confirmed, the mobile gateway engine 440 may receive a certificate from the security server 120 and process the certificate for validation and verification of the certificate for every session level secure connection between the client device 105 and the mobile enterprise server 115. After verification, the mobile gateway engine 440 may initiate communication with the client device 105, receive credentials from the client device 105, and redirect the credentials to the SSO engine 445 to carry out additional authentication. The mobile gateway engine 440 may be configured to call the web service engine 400 to establish two-way communication between the mobile enterprise server 115 and the client device 105. Once communication between the client device 105 and the mobile enterprise server 115 has been established, the mobile gateway engine 440 may search for various privacy breaches, such as a man-in-the-middle attack, and reject such communications if possible. The mobile gateway engine 440 may monitor communications for various attacks until the communication between the client device 105 and the mobile enterprise server 115 is closed. The mobile gateway engine 440 may employ secure sockets layer (SSL) encryption to encrypt communications between the client device 105 and the mobile enterprise server 115 at the transport layer level.

The single sign-on (SSO) engine 445 may authenticate the client device 105 based on credentials received from the client device 105. For example, if the mobile enterprise server 115 receives a request from the client device 105 without a security token, which may indicate that the client device 105 was previously authenticated, the request may be forwarded to the SSO engine 445 for authentication. The SSO engine 445 may require the user to provide credentials via, e.g., a log-in screen presented on the client device 105. The SSO engine 445 may authenticate the client device 105 based on the credentials and generate the security token, as discussed above. The security token may expire after a predetermined amount of time, and future communications between the client device 105 and mobile enterprise server 115 may commence without additional authentication by the SSO engine 445 so long as the security token is valid. The SSO engine 445, therefore, may determine whether the security token is valid when each communication session commences. The SSO engine 445 may be configured to provide subsequent security tokens for subsequent communication sessions between the client device 105 and the mobile enterprise server 115.

The exemplary modules shown in FIGS. 3 and 4 may be provided as software when executed by the processor 215 of the client device 105 or processing device 130B of the mobile enterprise server 115. Alternatively, the modules may be provided as hardware or firmware, or combinations of software, hardware, or firmware. Although particular modules are shown and described, features of the client device 105, mobile enterprise server 115, or both may be provided by fewer, greater, or differently named modules.

Figure 5:
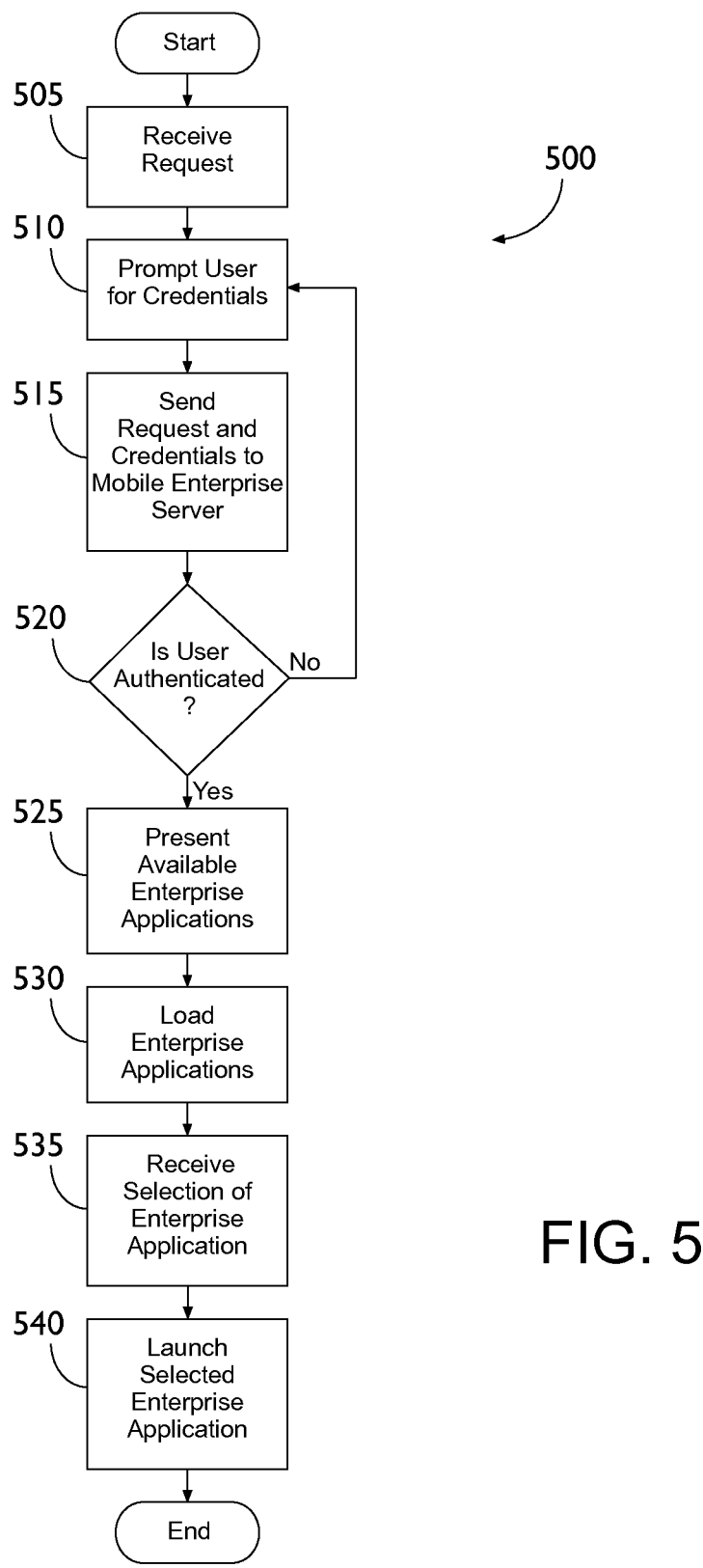
FIG. 5 is a flowchart of an exemplary process that may be implemented by the client device.

FIG. 5 illustrates an exemplary process flow diagram of a process 500 that may be implemented by the client device 105.

At block 505, the client device 105 may receive a request to access the client application 135. The request may be from a user and may be provided to the client device 105 via, e.g., the user interface device 210. The request may be the result of the user pressing a virtual button representing the client application 135. The request may represent the user's desire to launch the client application 135 to access one or more enterprise applications 140, enterprise data, or both.

At block 510, the client device 105 may prompt the user for credentials. The prompt may be presented to the user via the user interface device 210. The credentials may include a username, password, or biometric identifier. Additional credentials, such as an encryption key or token, that may be necessary for authentication may be accessed from the memory device 205 of the client device 105. In one possible approach, the processor 215 may call the log-in engine 305 to prompt the user for credentials.

At block 515, the client device 105 may transmit the request and the credentials to the mobile enterprise server 115 for authentication. Authentication may be based on whether the credentials prove that the client device 105 or user of the client device 105 is authorized to access the client application 135 and enterprise applications 140 contained within the client application 135. The communication between the client device 105 and the mobile enterprise server 115 may be managed, at least in part, by the communication engine 300.

At decision block 520, the client device 105 may determine whether the credentials provided are valid. For instance, the client device 105 may receive a message from the mobile enterprise server 115 indicating whether or not the credentials were valid. If so, the process 500 may continue at block 525. If not, the process 500 may return to block 510 to give the user another opportunity to provide valid credentials.

At block 525, the client device 105 may load available enterprise applications 140 into the client application 135. The available enterprise applications 140 may include enterprise applications 140 that the client device 105, user, or both, are authorized to view and use through the client application 135. Loading the available enterprise applications 140 may include presenting a list of available enterprise applications 140 or icons that virtually represent the available enterprise applications 140. Additionally or in the alternative, loading the available enterprise applications 140 may include receiving updates, upgrades, and possibly other information from the mobile enterprise server 115, for the available enterprise applications 140.

At block 530, the client device 105 may receive a selection of one or more of the enterprise applications 140. The selection may be from a user via, e.g., the user interface device 210. For instance, the selection may include the user selecting an icon or other virtual data representation associated with one of the available enterprise applications 140.

At block 535, the client device 105 may launch the selected enterprise application 140. When launched, the processor 215 may execute one or more of the modules discussed above. For instance, the processor 215 may call the memory protection engine 310 to allocate a memory location of the memory device 205 for the enterprise data of the selected enterprise application 140. The data wiping engine 320 may be called to selectively delete the enterprise data from the allocated memory location in due course. The data protection engine 315 may be called to encrypt the enterprise data for storage in the memory device 205 at the allocated memory location and decrypt the enterprise data for presentation to a user via, e.g., the user interface device 210. The locking engine 330 may be called to prevent unauthorized user access to the enterprise data. The policy enforcer engine 335 may be called to apply the security policy to the enterprise data.

Figure 6:
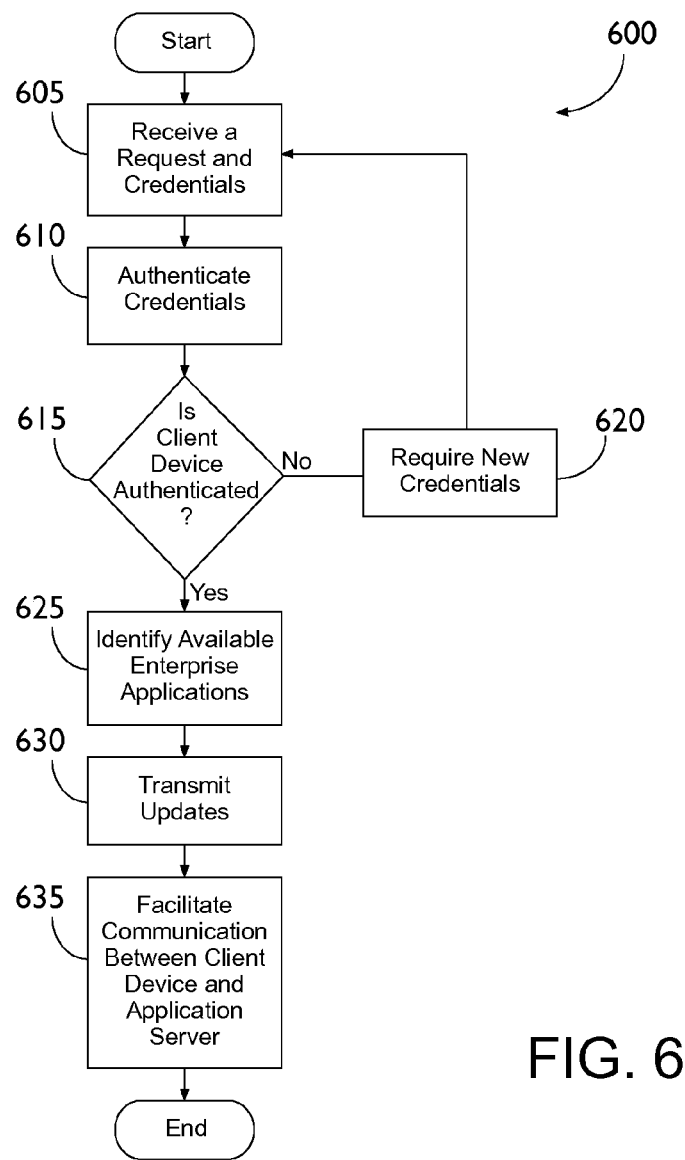
FIG. 6 is a flowchart of an exemplary process that may be implemented by the mobile enterprise server.

FIG. 6 illustrates an exemplary process 600 that may be implemented by the mobile enterprise server 115. The mobile enterprise server 115 may call one or more of the modules discussed above with respect to FIG. 4 to implement the process 600.

At block 605, the mobile enterprise server 115 may receive a request to access the client application 135 and credentials transmitted from the client device 105. The credentials may include a username, password, encryption key, token, or biometric identifier. The mobile enterprise server 115 may call the SSO engine 445, the mobile gateway engine 440, the authentication engine 425, or any combination of these engines at block 605.

At block 610, the mobile enterprise server 115 may authenticate the credentials received from the client device 105 at block 605. The mobile enterprise server 115 may transmit the credentials or a subset of the credentials to the security server 120 for authentication. The mobile enterprise server 115 may be configured to implement two-factor authentication. For example, the mobile enterprise server 115 may authenticate the client device 105 based on the username and password while the security server 120 may authenticate the client device 105 in accordance with the encryption key. The mobile enterprise server 115 may also or alternatively call the SSO engine 445, the authentication engine 425, or both, to authenticate the client device 105.

At decision block 615, the mobile enterprise server 115 may determine whether the client device 105 is authenticated. For instance, the mobile enterprise server 115 may make this determination based on the output of the SSO engine 445, authentication engine 425, or a signal received from the security server 120. If the client device 105 could not be authenticated or if the authentication failed, the process 600 may continue at block 620. If the mobile enterprise server 115 determines that the client device 105 is authenticated, the process 600 may continue at block 625.

At block 620, the mobile enterprise server 115 may require that the client device 105 transmit new or updated credentials. For instance, the mobile enterprise server 115 may transmit a signal to the client device 105 requesting that the user enter the username, password, or both, again. Alternatively or in addition, the mobile enterprise server 115 may request that the client device 105 send the encryption key or token again. The process 600 may return to block 605 after requesting that the client device 105 provide new credentials.

At block 625, the mobile enterprise server 115 may identify enterprise applications 140 that are available for the client device 105 to launch through the client application 135. The available enterprise applications 140 may be based on permissions associated with the user, the client device 105, or both. Additionally or in the alternative, the available enterprise applications 140 may be based on hardware characteristics of the client device 105. For instance, some enterprise applications 140 may be configured for mobile devices while others may be configured for desktop and laptop computers.

At block 630, the mobile enterprise server 115 may transmit updates, upgrades, and possibly other information associated with the available enterprise applications 140 to the client device 105. Versions of the enterprise applications 140 and enterprise data may therefore be synchronized with versions of the enterprise applications 140 and enterprise data stored in the application server 110.

At block 635, the mobile enterprise server 115 may facilitate communication between the client device 105 and the application server 110. When the client device 105 launches one or more of the enterprise applications 140, enterprise data is transmitted to and from the client device 105 and the application server 110. The mobile enterprise server 115 may facilitate the communication of the enterprise data in accordance with the modules described previously with reference to FIG. 4.

FIGS. 1-6 describe an exemplary system 100 that may be used to implement a Bring-Your-Own-Device (BYOD) policy that accommodates client devices 105 with different hardware components, operating systems, memory capabilities, networking capabilities, and the like. Moreover, the disclosed system 100 secures employee-owned client devices 105 to protect enterprise applications 140 and enterprise data from unauthorized access.

In general, computing systems and/or devices, such as the client device 105, the application server 110, the mobile enterprise server 115, and the security server 120, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system comprising:
an application server configured to host a plurality of enterprise applications and store enterprise data associated with each enterprise application;
a first client device configured to execute a client application providing access to the plurality of enterprise applications, wherein the client application includes a memory protection engine configured to allocate a first memory location for the enterprise data transmitted to the first client device and accessible to each of the plurality of enterprise applications through the client application and wherein the client application is configured to allocate a second memory location for non-enterprise data stored on the first client device; and
a mobile enterprise server in communication with the first client device and the application server, wherein the mobile enterprise server is configured to transmit the enterprise data to the first client device,
wherein at least one of:
a) a second client device is in communication with the mobile enterprise server, and
the mobile enterprise server is configured to:
i) store a plurality of security policies, including a first security policy for the first client device and a second security policy for the second client device, and transmit enterprise data to the first client device in accordance with the first security policy and to the second client device in accordance with the second security policy, or
ii) delete the enterprise data on, and lock, the first client device and the second client device in response to a security breach on the second client device,
b) the client application incorporates a data wiping engine configured to selectively delete the enterprise data from the first client device, by encrypting and overwriting the enterprise data at least a predetermined number of times, in accordance with at least one of a user request, a security policy, or a state of the first client device, or
c) the client application includes a locking engine configured to:
monitor usage of the first client device after a previous user has been authorized to use the first client device,
determine whether a present user of the first client device is the previous user, and
lock the first client device if the present user is different from the previous user.

2. The system of claim 1, wherein the mobile enterprise server is configured to store a security policy associated with the first client device; and
wherein the memory protection engine is configured to detect a request from an unauthorized application to access the enterprise data stored in the first memory location and deny the request from the unauthorized application in accordance with the security policy.

3. The system of claim 1, further comprising:
a second client device in communication with the mobile enterprise server; and
wherein the mobile enterprise server is configured to store a plurality of security policies, including a first security policy for the first client device and a second security policy for the second client device,
wherein the mobile enterprise server is configured to transmit enterprise data to the first client device in accordance with the first security policy and to the second client device in accordance with the second security policy.

4. The system of claim 1, wherein the client application incorporates a data wiping engine configured to selectively delete the enterprise data from the first client device, wherein the data wiping engine is configured to selectively delete the enterprise data in accordance with at least one of a user request, a security policy, and a state of the first client device.

5. The system of claim 4, wherein the data wiping engine is configured to selectively delete the enterprise data by encrypting and overwriting the enterprise data at least a predetermined number of times.

6. The system of claim 1, wherein the client application includes a data protection engine configured to encrypt the enterprise data for storage at the first memory location and decrypt the enterprise data stored at the first memory for presentation on the first client device.

7. The system of claim 1, wherein the client application includes a locking engine configured to:
prevent unauthorized user access to the enterprise data;
monitor usage of the first client device after a previous user has been authorized to use the first client device;
determine whether a present user of the first client device is the previous user; and
lock the first client device if the present user is different from the previous user.

8. The system of claim 7, wherein the locking engine is configured to delete the enterprise data from the first client device if the present user is different from the previous user.

9. The system of claim 7, wherein the locking engine is configured to delete the enterprise data in response to receiving a lock request from the mobile enterprise server.

10. The system of claim 1, wherein the client application includes a policy enforcer engine configured to receive a security policy from the mobile enterprise server and apply the security policy to the enterprise data, and
wherein the mobile enterprise server is configured to push the security policy to the first client device after the client application is executed.

11. The system of claim 1, further comprising a second client device in communication with the mobile enterprise server,
wherein the mobile enterprise server is configured to delete the enterprise data on the first client device and the second client device in response to a security breach on the second client device.

12. The system of claim 11, wherein the mobile enterprise server is configured to lock the first client device and the second client device in response to the security breach on the second client device.

13. A client device comprising:
a user interface device;
a first client device including a memory device; and
a processor in communication with the user interface device and the memory device, wherein the processor is configured to execute computer-readable instructions to implement:

a memory protection engine configured to allocate a memory location of the memory device for enterprise data accessible to each of a plurality of enterprise applications, a data wiping engine configured to selectively delete the enterprise data from the allocated memory location, a data protection engine configured to encrypt the enterprise data for storage in the memory device at the allocated memory location and decrypt the enterprise data for presentation to a user via the user interface device, a locking engine configured to prevent unauthorized user access to the enterprise data, and a policy enforcer engine configured to receive a security policy and apply the security policy to the enterprise data, wherein at least one of:
- a) a second client device is in communication with a mobile enterprise server, and
  the mobile enterprise server is configured to:
  i) store a plurality of security policies, including a first security policy for the first client device and a second security policy for the second client device, and transmit enterprise data to the first client device in accordance with the first security policy and to the second client device in accordance with the second security policy, or
  ii) delete the enterprise data on, and lock, the first client device and the second client device in response to a security breach on the second client device,
- b) the data wiping engine is configured to selectively delete the enterprise data from the first client device, by encrypting and overwriting the enterprise data at least a predetermined number of times, in accordance with at least one of a user request, a security policy, or a state of the first client device, or
- c) the locking engine configured to:
  monitor usage of the first client device after a previous user has been authorized to use the first client device,
  determine whether a present user of the first client device is the previous user, and
  lock the first client device if the present user is different from the previous user.

14. The client device of claim 13, wherein the data wiping engine is configured to selectively delete the enterprise data by encrypting and overwriting the enterprise data at least a predetermined number of times.

15. The client device of claim 13, wherein the locking engine is configured to monitor user inputs provided via the user input device after a previous user has been authorized, determine whether a present user is the previous user, and prevent access to the enterprise data if the present user is different from the previous user.

16. The client device of claim 13, wherein the policy enforcer is configured to determine whether the security policy has been violated.

17. A non-transitory computer-readable medium tangibly embodying computer-executable instructions comprising:

allocating a memory location of a memory device, as part of a first client device, for enterprise data accessible to each of a plurality of enterprise applications;

encrypting the enterprise data for storage at the allocated memory location;

decrypting the enterprise data for presentation to a user via a user interface device;

receiving a security policy from a mobile enterprise server;

applying the security policy to the enterprise data; and selectively deleting the enterprise data from the allocated memory location, wherein at least one of:
- a) a second client device is in communication with the mobile enterprise server, and
  the mobile enterprise server is configured to:
  i) store a plurality of security policies, including a first security policy for the first client device and a second security policy for the second client device, and transmit enterprise data to the first client device in accordance with the first security policy and to the second client device in accordance with the second security policy, or
  ii) delete the enterprise data on, and lock, the first client device and the second client device in response to a security breach on the second client device,
- b) a data wiping engine is configured to selectively delete the enterprise data from the first client device, by encrypting and overwriting the enterprise data at least a predetermined number of times, in accordance with at least one of a user request, a security policy, or a state of the first client device, or
- c) a locking engine is configured to:
  monitor usage of the first client device after a previous user has been authorized to use the first client device,
  determine whether a present user of the first client device is the previous user, and
  lock the first client device if the present user is different from the previous user.

18. The computer readable medium of claim 17, wherein the instructions further comprise selectively deleting the enterprise data includes encrypting and overwriting the enterprise data a predetermined number of times.

19. The computer readable medium of claim 17, wherein preventing unauthorized user access to the enterprise data includes:

monitoring usage of the client device after a previous user has been authorized to use the client device;

determining whether a present user of the client device is the previous user; and locking the client device and deleting the enterprise data from the client device if the present user is different from the previous user.

20. The system of claim 17, further comprising: deleting the enterprise data in response to receiving a lock request from the mobile enterprise server.

* * * * *